(12) United States Patent
Agoretti et al.

(10) Patent No.: US 9,598,559 B2
(45) Date of Patent: Mar. 21, 2017

(54) RUBBER TIRE COMPOUND PRODUCTION METHOD

(71) Applicant: BRIDGESTONE CORPORATION, Tokyo (JP)

(72) Inventors: Pasquale Agoretti, Ariccia (IT); Davide Privitera, Anzio (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/905,209

(22) PCT Filed: Jul. 18, 2014

(86) PCT No.: PCT/IB2014/063229
§ 371 (c)(1),
(2) Date: Jan. 14, 2016

(87) PCT Pub. No.: WO2015/008265
PCT Pub. Date: Jan. 22, 2015

(65) Prior Publication Data
US 2016/0145418 A1    May 26, 2016

(30) Foreign Application Priority Data

Jul. 18, 2013  (IT) .................. RM2013 A 0424

(51) Int. Cl.
C08K 5/548 (2006.01)
B60C 1/00 (2006.01)
C08J 3/24 (2006.01)
C08K 5/09 (2006.01)
C08J 3/215 (2006.01)
C08K 3/22 (2006.01)
C08K 3/36 (2006.01)
C08K 5/31 (2006.01)
C08K 5/47 (2006.01)

(52) U.S. Cl.
CPC ............ C08K 5/548 (2013.01); B60C 1/00 (2013.01); C08J 3/215 (2013.01); C08J 3/24 (2013.01); C08K 3/22 (2013.01); C08K 3/36 (2013.01); C08K 5/09 (2013.01); C08K 5/31 (2013.01); C08K 5/47 (2013.01); *C08J 2325/10* (2013.01); *C08K 2003/2296* (2013.01)

(58) Field of Classification Search
None
See application file for complete search history.

(56) References Cited

U.S. PATENT DOCUMENTS

| 5,580,919 | A | 12/1996 | Agostini et al. | |
| 8,017,696 | B2 * | 9/2011 | Lin | B60C 1/00 156/110.1 |
| 8,247,487 | B2 * | 8/2012 | Bethea | B60C 1/0016 523/157 |
| 8,349,956 | B2 * | 1/2013 | Lopitaux | B60C 1/0016 524/424 |
| 8,765,844 | B2 * | 7/2014 | Masumoto | B60C 1/0016 523/150 |
| 9,260,540 | B1 * | 2/2016 | Yan | C08F 8/34 |
| 2002/0161073 | A1 * | 10/2002 | Pawlikowski | C08K 3/0033 524/27 |
| 2005/0075422 | A1 * | 4/2005 | Resendes | C08K 9/04 523/210 |
| 2006/0096503 | A1 * | 5/2006 | Lee | C08L 95/00 106/670 |
| 2006/0173115 | A1 * | 8/2006 | Fudemoto | B60C 1/0008 524/445 |
| 2006/0235128 | A1 * | 10/2006 | Wang | C01B 33/44 524/445 |
| 2012/0214903 | A1 | 8/2012 | Masumoto | |
| 2013/0059965 | A1 | 3/2013 | Hirose | |

FOREIGN PATENT DOCUMENTS

| DE | 10 2012 100 321 A1 | 8/2012 |
| EP | 2 088 169 A1 | 8/2000 |
| EP | 2 098 384 A1 | 9/2009 |
| EP | 2 433 812 A1 | 3/2012 |
| EP | 2 452 831 A1 | 5/2012 |

OTHER PUBLICATIONS

International Search Report for PCT/IB2014/063229 dated Oct. 24, 2014.
Written Opinion for PCT/IB2014/063229 dated Oct. 24, 2014.

* cited by examiner

*Primary Examiner* — Robert S Loewe
(74) *Attorney, Agent, or Firm* — Sughrue Mion, PLLC

(57) ABSTRACT

A method of producing rubber compounds, in which the polymer base is composed partly of a first polymer material, which is either produced by emulsion polymerization or is natural rubber, and partly of a second polymer material produced by solution polymerization. The method includes a preliminary second polymer material treating step, in which the second polymer material, silica, a silane bonding agent, and at least one nucleophile agent are mixed with one another; a first mixing step, in which at least the first polymer material, silica, and a silane bonding agent are added to the compound resulting from the preliminary second polymer material treating step; and a second mixing step, in which stearic acid and a curing system are added to the compound being produced.

9 Claims, No Drawings

RUBBER TIRE COMPOUND PRODUCTION METHOD

CROSS REFERENCE TO RELATED APPLICATIONS

This application is a National Stage of International Application No. PCT/IB2014/063229 filed Jul. 18, 2014, claiming priority based on Italian Patent Application No. RM2013A000424 filed Jul. 18, 2013, the contents of all of which are incorporated herein by reference in their entirety.

TECHNICAL FIELD

The present invention relates to a rubber tyre compound production method.

One goal on which research in the tyre industry is constantly focused is in improving tyre rolling and abrasion resistance.

BACKGROUND ART

In this regard, silica has long been used as a reinforcing filler in tread compounds. Silica is used instead of carbon black and together with special chemical substances (silanes) which interact with the silanol groups of silica to prevent its particles from forming hydrogen bonds. With the right functionality, silanes may also interact with the polymer base to form a chemical bridge between it and the silica. Silica is employed for the advantages it affords in terms of rolling resistance and wet-road-holding performance.

As is well known within the industry, compounds may be produced using synthetic polymers produced by solution or emulsion synthesis. And, as is known from patent literature, appropriate activators may be used at the non-productive stages to enhance reactivity between the silica, silane, and polymer (U.S. Pat. No. 5,580,919B).

Tests show that, in silica-containing compounds, in which the polymer base is produced by emulsion polymerization, activators produce little improvement in the reactivity of the silica/silane/polymer system, thus resulting in less than optimum rolling and abrasion resistance of the compound.

The same problems are also encountered when using a natural rubber polymer base.

A need is therefore felt for a method of producing compounds, in which the polymer base is composed partly of natural rubber or a polymer produced by emulsion polymerization, but without impairing the rolling and abrasion resistance characteristics of the compound.

The Applicant has surprisingly discovered a method of producing compounds at least partly containing natural rubber or polymers produced by emulsion polymerization, without incurring the drawbacks of the known art.

With respect to the known art, the method according to the present invention involves no additional ingredients and no increase in the amount of ingredients used, but simply alters the timing with which they are mixed. In fact, using too many ingredients would make it difficult to control the various target properties of the compound.

DISCLOSURE OF INVENTION

The object of the present invention is a method of producing rubber compounds, in which the polymer base is composed partly of a first polymer material, which is either produced by emulsion polymerization or is natural rubber, and partly of a second polymer material produced by solution polymerization; said method being characterized by comprising a preliminary said second polymer material treating step, in which said second polymer material, silica, a silane bonding agent, and at least one nucleophile agent are mixed with one another; a first mixing step, in which at least said first polymer material, silica, and a silane bonding agent are added to the compound resulting from the preliminary said second polymer material treating step; and a second mixing step, in which stearic acid and a curing system are added to the compound being produced.

Said nucleophile agent is preferably a curing accelerant, and even more preferably is in the guanidine class.

Preferably, the guanidine class nucleophile agent is selected from the group consisting of diphenyl guanidine (DPG), triphenyl guanidine (TPG), diorthotolyl-guanidine (DOTG), o-tolylbiguanidine (OTBG), guanidine salts (nitrates, carbonates, acetates, thiocyanates, sulphates) and derivatives thereof.

Preferably, 0.6 to 5 phr of the guanidine class nucleophile agent is added at the preliminary said second polymer material treating step.

Preferably, said method comprises a preliminary said first polymer material treating step parallel to said preliminary said second polymer material treating step, and in which said first polymer material, silica, a silane bonding agent, and at least one curing accelerant in the sulphenamide class are mixed with one another; at said first mixing step, the compound resulting from said preliminary said first polymer material treating step being mixed with the compound resulting from the preliminary said second polymer material treating step.

Preferably, the sulphenamide class curing accelerant is selected from the group consisting of benzothiazyl-cyclohexyl-sulphenamide (CBS), N-tert-butyl-2-benzothiazyl sulphenamide (TBBS), 2-mercaptobenzothiazole (MBT), sodium or zinc salts of 2-mercaptobenzothiazole (ZMBT), benzothiazyl-2-dicyclohexyl sulphenamide (DCBS), benzothiazole disulphide (MBTS), tetrabenzylthiuramdisulphide (TBzTD), and mixtures thereof.

Preferably, 0.6 to 5 phr of the sulphenamide class curing accelerant is mixed with said first polymer material.

Preferably, said first polymer material and said second polymer material are styrene-butadiene copolymer (SBR)-based.

BEST MODE FOR CARRYING OUT THE INVENTION

The following are non-limiting examples for a clearer understanding of the present invention.

Examples

Four control compounds (Ctrl 1-Ctrl 4) and two compounds according to the present invention (Inv.1, Inv.2) were produced.

More specifically, compound Ctrl 1 relates to a known compound, in which all the polymer base, the silica, the silane bonding agent, and the stearic acid are added and mixed simultaneously at a first mixing step, whereas the nucleophile agents in the guanidine and sulphonamide classes are only mixed into the compound at the final mixing step, together with the curing system.

Compound Ctrl 2 differs from Ctrl 1 by the stearic acid being added at the final, as opposed to the first, mixing step; and by the guanidine class nucleophile agent being added at the first, as opposed to the final, mixing step.

Compound Ctrl 3 differs from Ctrl 1 by the stearic acid being added at the final, as opposed to the first, mixing step; and by the sulphenamide class nucleophile agent being added at the first, as opposed to the final, mixing step.

Compound Ctrl 4 differs from Ctrl 1 by the emulsion polymerization part of the polymer base being mixed beforehand with part of the silica, part of the silane bonding agent, and the sulphenamide class nucleophile agent; and by the stearic acid being added at the final, as opposed to the first, mixing step.

The first compound Inv.1 according to the invention differs from Ctrl 1 by the solution polymerization part of the polymer base being mixed beforehand with part of the silica, part of the silane bonding agent, and the guanidine class nucleophile agent; and by the stearic acid being added at the final, as opposed to the first, mixing step.

The second compound Inv.2 according to the invention differs from Ctrl 1 by the solution polymerization part of the polymer base being mixed beforehand with part of the silica, part of the silane bonding agent, and the guanidine class nucleophile agent; by the fact that, parallel to this, the emulsion polymerization part of the polymer base is first mixed with part of the silica, part of the silane bonding agent, and the sulphenamide class nucleophile agent, and is then mixed with the solution polymerization part of the polymer base already treated; and by the stearic acid being added at the final, as opposed to the first, mixing step.

Control compounds Ctrl 1-Ctrl 3 were produced as follows:

—Compound Preparation—

(First Mixing Step)

Prior to mixing, a 230-270-liter, tangential-rotor mixer was loaded with the ingredients shown in Table I to a fill factor of 66-72%.

The mixer was operated at a speed of 40-60 rpm, and the resulting compound unloaded on reaching a temperature of 140-160° C.

(Final Mixing Step)

The ingredients in Table I were added to the compound from the preceding mixing step to a fill factor of 63-67%.

The mixer was operated at a speed of 20-40 rpm, and the resulting compound unloaded on reaching a temperature of 100-110° C.

Compounds Inv.1 and Inv.2 according to the invention, and control compound Ctrl 4 were produced as follows:

—Compound Preparation—

(Preliminary Treatment of the Emulsion and/or Solution Polymerization Polymer Base)

Prior to mixing, a 230-270-liter, tangential-rotor mixer was loaded with the ingredients shown in Table II to a fill factor of 66-72%.

The mixer was operated at a speed of 40-60 rpm, and the resulting compound unloaded on reaching a temperature of 140-160° C.

(First Mixing Step)

Prior to mixing, a 230-270-liter, tangential-rotor mixer was loaded with the ingredients shown in Table II to a fill factor of 66-72%.

The mixer was operated at a speed of 40-60 rpm, and the resulting compound unloaded on reaching a temperature of 140-160° C.

(Final Mixing Step)

The ingredients in Table I were added to the compound from the preceding step to a fill factor of 63-67%.

The mixer was operated at a speed of 20-40 rpm, and the resulting compound unloaded on reaching a temperature of 100-110° C.

With respect to the above, the process for producing the compounds according to the present invention may comprise a further mixing step between the first mixing step and the final mixing step.

Table I shows the compositions in phr of compounds Ctrl 1-Ctrl 3, and the steps in which the ingredients were added.

TABLE I

|  | Ctrl. 1 | Ctrl. 2 | Ctrl. 3 |
|---|---|---|---|
| First mixing step | | | |
| S-SBR | 50 | 50 | 50 |
| E-SBR | 50 | 50 | 50 |
| CB | 8 | 8 | 8 |
| Silica | 80 | 80 | 80 |
| Silane bonding agent | 8 | 8 | 8 |
| DPG | — | 1 | — |
| MBTS | — | — | 1 |
| Stearic acid | 2 | — | — |
| Final mixing step | | | |
| Stearic acid | — | 2 | 2 |
| Sulphur | 1.4 | 1.4 | 1.4 |
| ZnO | 2.0 | 2.0 | 2.0 |
| DPG | 1 | — | 1 |
| MBTS | 1 | 1 | — |

Table II shows the compositions in phr of compounds Ctrl 4, Inv.1 and Inv.2, and the steps in which the ingredients were added. In Table II, 'mix E-SBR' and 'mix S-SBR' mean the compounds resulting from the E-SBR and S-SBR polymer base treating steps respectively.

TABLE II

|  | Ctrl. 4 | Inv. 1 | Inv. 2 | |
|---|---|---|---|---|
|  | E-SBR treatment | S-SBR treatment | S-SBR treatment | E-SBR treatment |
| S-SBR | — | 50 | 50 | — |
| E-SBR | 50 | — | — | 50 |
| Silica | 40 | 40 | 40 | 40 |
| Silane bonding agent | 4 | 4 | 4 | 4 |
| DPG | — | 1 | 1 | — |
| MBTS | 1 | — | — | 1 |
| First mixing step | | | | |
| S-SBR | 50 | — | mix E-SBR + mix S-SBR | |
| E-SBR | — | 50 | | |
| Silica | 40 | 40 | | |
| Silane bonding agent | 4 | 4 | | |
| CB | 8 | 8 | 8 | |
| Final mixing step | | | | |
| Strearic acid | 2 | 2 | 2 | |
| Sulphur | 1.4 | 1.4 | 1.4 | |
| ZnO | 2.0 | 2.0 | 2.0 | |
| DPG | 1 | — | — | |
| MBTS | — | 1 | — | |

E-SBR is a polymer base obtained by a process of polymerization in emulsion, with a mean molecular weight of $800\text{-}1500 \times 10^3$ and $500\text{-}900 \times 10^3$ respectively, a 20 to 45% styrene content, and used with a 0 to 30% oil content;

S-SBR is a polymer base obtained by a process of polymerization in solution, with a mean molecular weight of $800\text{-}1500 \times 10^3$ and $500\text{-}900 \times 10^3$ respectively, and a 20 to 45% styrene content;

the silica used is marketed by EVONIK under the trade name VN3, and has a surface area of roughly 170 m$^2$/g;

the silane bonding agent used is of formula $(CH_3CH_2O)_3Si(CH_2)_3SS(CH_2)_3Si(OCH_2CH_3)_3$ and is marketed by EVONIK under the trade name SI75;

MBTS stands for mercaptobenzothiazole disulphide;
DPG stands for diphenyl-guanidine;

The compounds in Tables I and II were tested to determine their rolling resistance and abrasion resistance related properties.

More specifically, dynamic properties were measured as per ISO Standard 4664 (as anyone skilled in the art knows, 60° C. tan δ values are closely related to rolling resistance properties: the lower the 60° C. tan δ value, the better the rolling resistance); abrasion resistance was measured as per ISO Standard 4649.

Table III shows the results from the above tests, the values of which are indexed on the basis of the standard method control compound Ctrl 1 results.

TABLE III

|  | Ctrl. 1 | Ctrl. 2 | Ctrl. 3 | Ctrl. 4 | Inv. 1 | Inv. 2 |
| --- | --- | --- | --- | --- | --- | --- |
| Rolling resistance | 100 | 110 | 110 | 110 | 120 | 130 |
| Abrasion resistance | 100 | 105 | 105 | 108 | 110 | 115 |

As shown clearly in Table III, the compounds produced using the method according to the present invention have a better rolling resistance and better abrasion resistance, indicating better interaction of the silica with the polymer base.

More specifically, it is important to note how the discriminating characteristic in achieving the target advantages lies in preliminary treatment of the solution polymerization part of the polymer base. In fact, as shown by the control compound Ctrl 4 data, simply pre-treating the emulsion polymerization part of the polymer base is not particularly effective.

Nevertheless, a preferred embodiment of the method according to the invention also comprises a further preliminary treatment step to treat the part of the polymer base produced by emulsion polymerization and/or containing natural rubber.

The invention claimed is:

1. A method for producing a rubber composition comprising a polymer base, in which the polymer base is comprised of a first polymer material which is either a natural rubber or a polymer produced by emulsion polymerization, and a second polymer material produced by solution polymerization; said method being characterized by comprising:
   (A) a preliminary said second polymer material treating step, in which the said second polymer material, silica, a silane bonding agent, and at least one nucleophile agent are mixed with one another;
   (B) a first polymer material treating step, in which at least the first polymer material, silica, and a silane bonding agent are added to the compound resulting from step (A), and
   (C) adding stearic acid and a curing system to produce said rubber composition.

2. The method of producing a rubber composition, as claimed in claim 1, characterized in that said nucleophile agent is a curing accelerant.

3. The method of producing a rubber composition, as claimed in claim 2, characterized in that said nucleophile agent is in the guanidine class.

4. The method of producing a rubber composition, as claimed in claim 3, characterized in that the guanidine class nucleophile agent is selected from the group consisting of diphenyl guanidine (DPG), triphenyl guanidine (TPG), diorthotolyl-guanidine (DOTG), o-tolylbiguanidine (OTBG), guanidine salts (nitrates, carbonates, acetates, thiocyanates, sulphates) and derivatives thereof.

5. The method of producing the rubber composition as claimed in claim 3, characterized in that 0.6 to 5 phr of the guanidine class nucleophile agent is added in step (A).

6. The method of producing a rubber composition, as claimed in claim 1, characterized by comprising a preliminary said first polymer material treating step parallel to said preliminary said second polymer material treating step, and in which said first polymer material, silica, a silane bonding agent, and at least one curing accelerant in the sulphenamide class are mixed with one another; at said first mixing step, the compound resulting from said preliminary said first polymer material treating step being mixed with the compound resulting from the preliminary said second polymer material treating step.

7. The method of producing a rubber composition, as claimed in claim 6, characterized in that the sulphenamide class curing accelerant is selected from the group consisting of benzothiazyl-cyclohexyl-sulphenamide (CBS), N-tert-butyl-2-benzothiazyl sulphenamide (TBBS), 2-mercaptobenzothiazole (MBT), sodium or zinc salts of 2-mercaptobenzothiazole (ZMBT), benzothiazyl-2-dicyclohexyl sulphenamide (DCBS), benzothiazole disulphide (MBTS), tetrabenzylthiuramdisulphide (TBzTD), and mixtures thereof.

8. The method of producing a rubber composition, as claimed in claim 6, characterized in that 0.6 to 5 phr of the sulphenamide class curing accelerant is mixed with said first polymer material.

9. The method of producing a rubber composition, as claimed in claim 1, characterized in that said first polymer material and said second polymer material are styrene-butadiene copolymer (SBR)-based.

* * * * *